United States Patent
Li et al.

(10) Patent No.: US 10,601,504 B2
(45) Date of Patent: Mar. 24, 2020

(54) METHOD AND APPARATUS FOR MONITORING POLARIZATION DEPENDENT LOSS, RECEIVER AND COMMUNICATION SYSTEM

(71) Applicant: FUJITSU LIMITED, Kawasaki-shi, Kanagawa (JP)

(72) Inventors: Huihui Li, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/125,945

(22) Filed: Sep. 10, 2018

(65) Prior Publication Data
US 2019/0097721 A1   Mar. 28, 2019

(30) Foreign Application Priority Data

Sep. 27, 2017   (CN) .......................... 2017 1 0890685

(51) Int. Cl.
*H04B 10/079* (2013.01)
*H04J 14/06* (2006.01)
(Continued)

(52) U.S. Cl.
CPC ... *H04B 10/07951* (2013.01); *H04B 10/0775* (2013.01); *H04B 10/0795* (2013.01);
(Continued)

(58) Field of Classification Search
None
See application file for complete search history.

(56) References Cited

U.S. PATENT DOCUMENTS

| 2001/0052973 A1 | 12/2001 | Marro et al. |
| 2009/0213453 A1 | 8/2009 | Yao |

(Continued)

FOREIGN PATENT DOCUMENTS

| CN | 1348543 A | 5/2002 |
| CN | 1988419 A | 6/2007 |
| CN | 103973408 A | 8/2014 |

OTHER PUBLICATIONS

Dou et al: "Differential Pilots Aided In-Band OSNR Monitor with Large Nonlinear Tolerance", OFC 2015, Mar. 22-26, 2015, paper W4D3, pp. 1-3 (Year: 2015).*

(Continued)

*Primary Examiner* — Li Liu
(74) *Attorney, Agent, or Firm* — Staas & Halsey LLP

(57) ABSTRACT

Embodiments of this disclosure provide an apparatus and method for monitoring a polarization dependent loss, a receiver and a communication system. The apparatus for monitoring a polarization dependent loss includes: a first processing unit configured to process received optical signals, to obtain a first correlation matrix of noise signals in the received optical signals and a second correlation matrix of second signals or other signals in the received optical signals other than first signals or spectral feature signals having predetermined spectral features; a matrix subtraction unit configured to subtract the second correlation matrix by the first correlation matrix, to obtain a third matrix; and a calculating unit configured to perform singular value decomposition on the third matrix, and calculate a polarization dependent loss according to a result of the singular value decomposition. According to the embodiments of this disclosure, the polarization dependent loss may be calculated more accurately.

11 Claims, 5 Drawing Sheets

(51) Int. Cl.
*H04B 10/61* (2013.01)
*H04B 10/077* (2013.01)
*H04B 10/2507* (2013.01)

(52) U.S. Cl.
CPC ... *H04B 10/07953* (2013.01); *H04B 10/2572* (2013.01); *H04B 10/614* (2013.01); *H04B 10/6161* (2013.01); *H04B 10/6162* (2013.01); *H04J 14/06* (2013.01); *H04B 2210/075* (2013.01)

(56) References Cited

U.S. PATENT DOCUMENTS

| | | | |
|---|---|---|---|
| 2012/0170929 A1* | 7/2012 | Xie | H04B 10/0793 398/33 |
| 2013/0142507 A1 | 6/2013 | Mandai et al. | |
| 2016/0241341 A1* | 8/2016 | Endo | H04B 10/50 |
| 2018/0123700 A1* | 5/2018 | Li | H04B 10/0795 |

OTHER PUBLICATIONS

Zhou et al., "Constant Modulus Algorithm with Reduced Probability of Singularity Enabled by PDL Mitigation" Journal of Lightwave Technology, vol. 35, No. 13, Jul. 1, 2017**.

* cited by examiner

METHOD AND APPARATUS FOR MONITORING POLARIZATION DEPENDENT LOSS, RECEIVER AND COMMUNICATION SYSTEM

CROSS-REFERENCE TO RELATED APPLICATIONS

This application claims the benefit of Chinese Patent Application No. 201710890685.5, filed Sep. 27, 2017, in the State Intellectual Property Office of China, the disclosure of which is incorporated herein by reference.

BACKGROUND

1. Field

This disclosure relates to the field of optical communication technologies, and in particular to a method and apparatus for monitoring a polarization dependent loss, a receiver and a communication system.

2. Description of the Related Art

A polarization dependent loss (PDL) reflects differences between maximum transmissions of an optical transmission link in polarization states, and is a ratio of maximum transmission power to minimum transmission power of an optical transmission link in polarization states.

As increase of a transmission performance of an optical transmission link, more and more attention is paid to the PDL. On the one hand, the PDL may reflect information on a transmission channel, and is helpful to control a transmission network. On the other hand, in a long-haul transmission, a damage of the PDL to signals is not ignorable or neglectable. Hence, there is need to monitor a PDL.

Document 1 (Junhe Thou, Member, IEEE, Guozeng Zheng, and Jianjie Wu. "Constant Modulus Algorithm With Reduced Probability of Singularity Enabled by PDL Mitigation". Journal Of Lightwave Technology, VOL. 35, NO. 13, Jul. 1, 2017) proposes a method for estimating a polarization dependent loss, in which correlation processing is performed on a received optical signal to obtain a correlation matrix, then singular value decomposition is performed on the correlation matrix, and the polarization dependent loss may be estimated according a result of the singular value decomposition.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that the method in Document 1 does not take a factor of a noise in an optical transmission link into account, and hence, there exists a relative large error in the calculated polarization dependent loss; wherein, the noise may be, for example, an amplifier spontaneous emission (ASE) noise. Furthermore, in Document 1, in calculating the polarization dependent loss, an influence of polarization mode dispersion (PMD) effect is not taken into account.

Embodiments of this disclosure provide a method and apparatus for monitoring a polarization dependent loss, a receiver and a communication system, in which an influence of a noise is removed from a correlation matrix of a received optical signal, singular value decomposition is performed, and the polarization dependent loss is calculated, thereby eliminating an effect of the noise on a result of calculation of the polarization dependent loss.

According to a first aspect of the embodiments of this disclosure, there is provided an apparatus for monitoring a polarization dependent loss (PDL), including:

a first processing unit or processor configured to process received optical signals, to obtain a first correlation matrix of noise signals in the received optical signals and a second correlation matrix of second signals in the received optical signals other than first signals having predetermined spectral features;

a matrix subtraction unit or subtractor configured to subtract the second correlation matrix by the first correlation matrix, to obtain a third matrix; and a calculating unit or calculator configured to perform singular value decomposition on the third matrix, and calculate a polarization dependent loss (PDL) according to a result of the singular value decomposition.

According to a second aspect of the embodiments of this disclosure, there is provided a receiver, including the apparatus for monitoring a polarization dependent loss as described in the first aspect.

According to a third aspect of the embodiments of this disclosure, there is provided a communication system, including a transmitter and a receiver; the transmitter is configured to transmit optical signals containing payloads and signals with known frequencies to the receiver, frequencies of the signals with known frequencies being different in two polarization states of the optical signals, and the receiver is the receiver as described in the second aspect.

According to a fourth aspect of the embodiments of this disclosure, there is provided a method for monitoring a polarization dependent loss (PDL), including:

processing received optical signals, to obtain a first correlation matrix of noise signals in the received optical signals and a second correlation matrix of second signals in the received optical signals other than first signals having predetermined spectral features;

subtracting the second correlation matrix by the first correlation matrix, to obtain a third matrix; and performing singular value decomposition on the third matrix, and calculating a polarization dependent loss (PDL) according to a result of the singular value decomposition.

An advantage of the embodiments of this disclosure exists in that an influence of a noise is removed from a correlation matrix of a received optical signal, singular value decomposition is performed, and the polarization dependent loss is calculated, thereby eliminating an effect of the noise on a result of calculation of the polarization dependent loss.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

Additional aspects and/or advantages will be set forth in part in the description which follows and, in part, will be apparent from the description, or may be learned by practice of the invention.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of the present disclosure provides an apparatus for monitoring a polarization dependent loss (PDL), which is applicable to a receiver of an optical communication system, and may calculate the polarization dependent loss according to a received signal received by the receiver.

Figure 1:
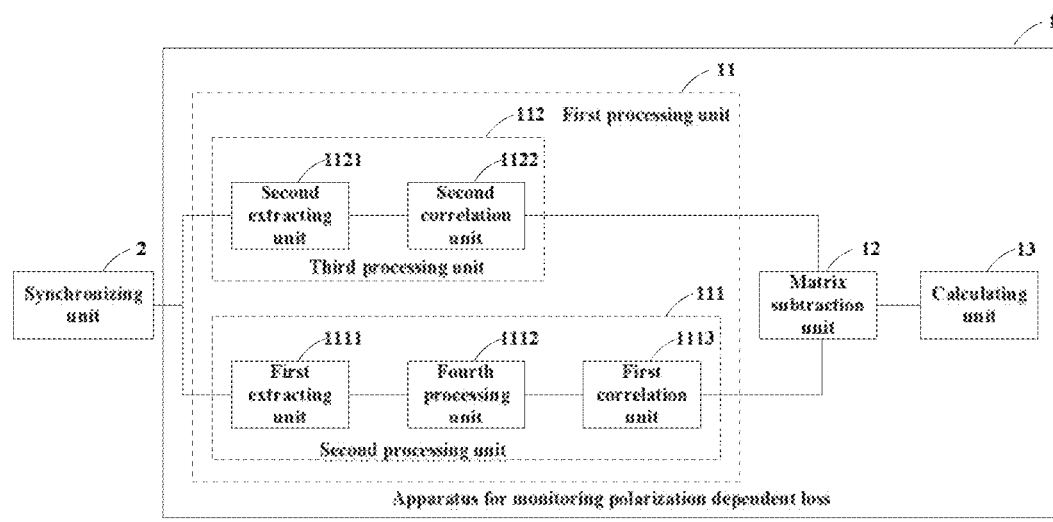
FIG. 1 is a schematic diagram of the apparatus for monitoring a polarization dependent loss of Embodiment 1 of this disclosure.

FIG. 1 is a schematic diagram of the apparatus for monitoring a polarization dependent loss of Embodiment 1 of this disclosure. As shown in FIG. 1, the apparatus 1 may include a first processing unit 11, a matrix subtraction unit 12 and a calculating unit 13.

In this embodiment, the first processing unit 11 processes received optical signals, to obtain a first correlation matrix of noise signals in the received optical signals and a second correlation matrix of second signals in the received optical signals; the second signals are signals in the received optical signals other than first signals having predetermined spectral features; the matrix subtraction unit 12 subtracts the second correlation matrix by the first correlation matrix, to obtain a third matrix; and the calculating unit 13 performs singular value decomposition on the third matrix, and calculate a polarization dependent loss (PDL) according to a result of the singular value decomposition.

According to this embodiment, an influence of a noise is removed from a correlation matrix of a received optical signal, singular value decomposition is performed, and the polarization dependent loss is calculated, thereby eliminating an effect of the noise on a result of calculation of the polarization dependent loss.

In this embodiment, the received optical signals are optical signals from a transmitter.

The transmitter may transmit optical signals containing payloads and signals with known frequencies; frequencies of the signals with known frequencies are different in two polarization states of the optical signals.

The signals with known frequencies contained in the optical signals transmitted by the transmitter may be, for example, pilot signals, and the pilot signals may, for example, have a single frequency. The following description of this embodiment shall be given by taking that the signals with known frequencies are pilot signals having a single frequency as an example. However, this embodiment is not limited thereto, and the signals with known frequencies may also have other frequencies and have other spectral features.

In this embodiment, frequencies of the pilot signals in different polarization states of the optical signals may be different, and the different polarization states may include an X polarization state and a Y polarization state; the X polarization state and the Y polarization state may be, for example, a horizontal polarization state (H polarization state) and a vertical polarization state (V polarization state), respectively.

In this embodiment, the optical transmitter may transmit pilot signals and non-pilot signals after combining them. Hence, the optical signals transmitted by the transmitter may contain pilot signals and non-pilot signals, and the non-pilot signals may be, for example, payloads.

Figure 2:
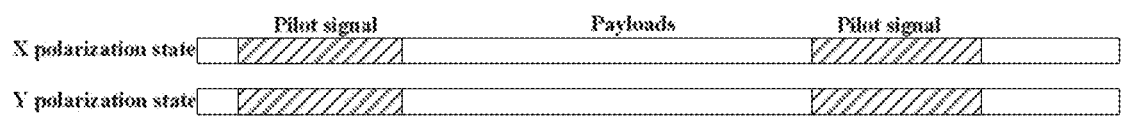
FIG. 2 is a schematic diagram of a time-domain structure of an optical signal inserted with a pilot signal.

FIG. 2 is a schematic diagram of a time-domain structure of an optical signal inserted with a pilot signal. As shown in FIG. 2, the optical signals transmitted by the transmitter may contain pilot signals and non-pilot signals, and the non-pilot signals are actually-transmitted data, i.e. payloads.

Figure 3:
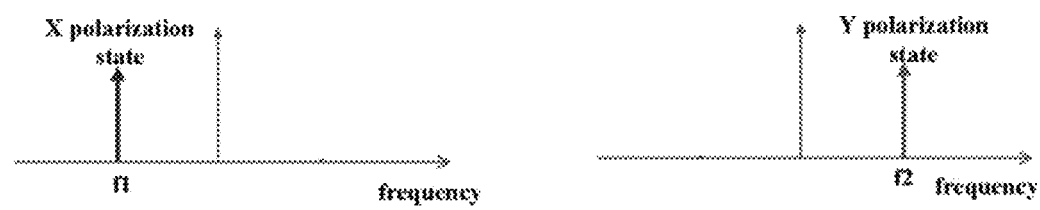
FIG. 3 is a spectral diagram of the pilot signal of Embodiment 1 of this disclosure.

FIG. 3 is a spectral diagram of the pilot signals of this embodiment. In FIG. 3, the horizontal axis denotes a frequency, and the vertical axis denotes power. As shown in FIG. 3, in the X polarization state of the optical signals transmitted by the transmitter, the pilot signals have a single frequency f1, and in the Y polarization state of the optical signals transmitted by the transmitter, the pilot signals have a single frequency f2. And furthermore, this embodiment is not limited thereto, and the pilot signals may not have a single frequency, but have a frequency bin.

Figure 4:
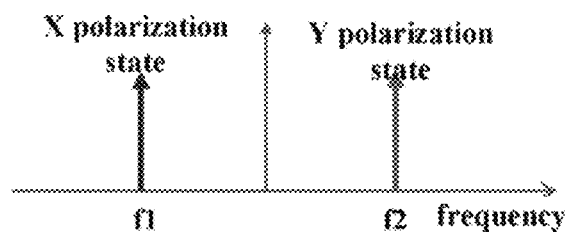
FIG. 4 is a schematic diagram of expressing a spectrum of the pilot signal in an X polarization state and a spectrum of the pilot signal in a Y polarization state in the same spectrum.

FIG. 4 is a schematic diagram of expressing a spectrum of the pilot signal in an X polarization state and a spectrum of the pilot signal in a Y polarization state in the same spectrum. In FIG. 4, the horizontal axis denotes a frequency, and the vertical axis denotes power. As shown in FIG. 4, a spectral feature of the pilot signal in the X polarization state is that there exists a peak value of power at the frequency f1, and a spectral feature of the pilot signal in the Y polarization state is that there exists a peak value of power at the frequency f2.

In this embodiment, f2 may be equal to −f1, and furthermore, a relationship between f1 and f2 may not be limited thereto.

In this embodiment, the transmitter transmits, for example, optical signals containing pilot signals shown in FIG. 2, the optical signals transmitted via an optical transmission link, and the apparatus 1 for monitoring a polarization dependent loss may calculate the polarization dependent loss according to the optical signals from the transmitter.

In this embodiment, as shown in FIG. 1, the first processing unit may include a second processing unit 111 and a third processing unit 112.

In this embodiment, the second processing unit 111 may be configured to process the received optical signals, to obtain the first correlation matrix $R_{nn}$; and the third processing unit 112 may be configured to process the received optical signals, to obtain the second correlation matrix $R_{ss}$.

In this embodiment, the second processing unit 111 may include a first extracting unit 1111, a fourth processing unit 1112 and a first correlation unit 1113.

In this embodiment, the first extracting unit 1111 may extract the first signals from the received optical signals; the fourth processing unit 1112 may perform elimination of the predetermined spectral features on the first signals, to obtain the noise signals; and the first correlation unit 1113 may perform correlation processing on the noise signals, to generate the first correlation matrix $R_{nn}$.

In this embodiment, the first extracting unit 1111 may extract signals having the predetermined spectral features from the received optical signals and take them as the first signals; the predetermined spectral features may be, for example, identical to spectral features of pilot signals in the optical signals transmitted by the transmitter.

In this embodiment, as shown in FIGS. 2, 3 and 4, in the X polarization state of the optical signals, the pilot signals have the single frequency f1, and their spectral features are that they have a peak value of power at the frequency f1, and in the Y polarization state of the optical signals, the pilot signals have the single frequency f2, and their spectral features are that they have a peak value of power at the frequency 172.

In this embodiment, the first extracting unit 1111 may extract signals from the signals in the X polarization state of the optical signals having the same spectral features as the pilot signals in the X polarization state in FIG. 3, and take them as the first signals in the X polarization state; and the first extracting unit 1111 may extract signals from the signals in the Y polarization state of the optical signals having the same spectral features as the pilot signals in the Y polarization state in FIG. 3, and take them as the first signals in the Y polarization state.

In this embodiment, the first signals extracted by the first extracting unit 1111 may be expressed as $E_p$; wherein, $E_p$ may be a matrix of two rows and N columns, that is, $$E_p = \begin{bmatrix} E_{p,x} \\ E_{p,y} \end{bmatrix};$$

where, N is a natural number, and denotes a length of the first signals.

Figure 5:
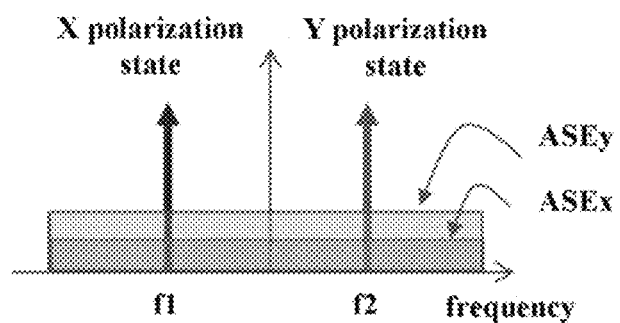
FIG. 5 is a schematic diagram of expressing spectra of the first signals in the X polarization state and spectra of the first signals in the Y polarization state in the same spectrum.

FIG. 5 is a schematic diagram of expressing spectra of the first signals in the X polarization state and spectra of the first signals in the Y polarization state in the same spectrum. In FIG. 5, the horizontal axis denotes a frequency, and the vertical axis denotes power. As shown in FIG. 5, a spectral feature of the first signals in the X polarization state is that there exists a peak value of power at the frequency f1, and a spectral feature of the first signals in the Y polarization state is that there exists a peak value of power at the frequency f2.

In this embodiment, as shown in FIG. 5, the first signals in the X polarization state and the first signals in the Y polarization state extracted by the first extracting unit 1111 all have noises, the noises being, for example, amplifier spontaneous emission (ASE) noises, denoted by $ASE_x$ and $ASE_y$, respectively.

In this embodiment, the first extracting unit 1111 may extract the first signals according to positions of the first signals in the time domain, the first signals corresponding to the pilot signals in the optical signals transmitted by the transmitter. For example, the positions of the first signals in the time domain are determined by a synchronizing unit 2 in the optical receiver. Reference may be made to the related art for the synchronizing unit 2, which shall not be described herein any further.

In this embodiment, the fourth processing unit 1112 may eliminate the predetermined spectral features in the first signals $E_p$, to convert the first signals into the noise signals $E_n$, the noise signals being also a matrix of two rows and N columns, that is, $$E_n = \begin{bmatrix} E_{n,x} \\ E_{n,y} \end{bmatrix}.$$

For example, the fourth processing unit 1112 may process, to eliminate the peak values of power of the first signals $E_p$ at the frequencies f1 and f2, thereby converting the first signals into the noise signals.

Figure 6:
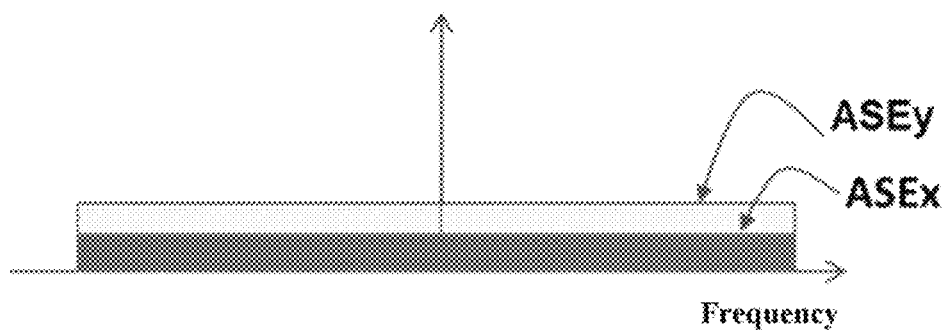
FIG. 6 is a schematic diagram of spectra of the noise signals obtained by the fourth processing unit of Embodiment 1 of this disclosure.

FIG. 6 is a schematic diagram of spectra of the noise signals obtained by the fourth processing unit. As shown in FIG. 6, components of the noise signals in the X polarization state and in the Y polarization state may be expressed as $ASE_x$ and $ASE_y$, respectively.

In this embodiment, the first correlation unit 1113 may perform correlation processing on the noise signals $E_n$, to generate the first correlation matrix $R_{nn}$. The correlation, for example, may be performed by using formula (1) below:

$$R_{nn} = \langle E_n E_n^H \rangle = \left\langle \begin{bmatrix} E_{n,x} \\ E_{n,y} \end{bmatrix} \times [E_{n,x}^* \ E_{n,y}^*] \right\rangle = \begin{bmatrix} \langle E_{n,x} E_{n,x}^* \rangle & \langle E_{n,x} E_{n,y}^* \rangle \\ \langle E_{n,y} E_{n,x}^* \rangle & \langle E_{n,y} E_{n,y}^* \rangle \end{bmatrix}; \quad (1)$$

where, $\langle \cdot \rangle$ denotes an averaging operation, * denotes a conjugate operation, and H denotes a conjugate transpose operation.

As shown in FIG. 1, the third processing unit 112 may include a second extracting unit 1121 and a second correlation unit 1122; wherein, the second extracting unit 1121 may extract the second signals from the received optical signals, and the second correlation unit 1122 may perform correlation processing on the second signals, to generate the second correlation matrix.

In this embodiment, the second signals may be signals in the received optical signals other than the first signals, and may be expressed as $E_s$, which may a matrix of two rows and N columns, that is, $$E_s = \begin{bmatrix} E_{s,x} \\ E_{s,y} \end{bmatrix}.$$

In this embodiment, the second signals also contain noises of the optical transmission link.

In this embodiment, the second extracting unit 1121 may extract the second signals at positions different from the positions of the first signals in the time domain, and the second signals may correspond to the payloads in the optical signals transmitted by the transmitter.

In this embodiment, the second correlation unit 1122 may perform correlation processing on the second signals $E_s$, to generate the second correlation matrix $R_{ss}$. The correlation, for example, may be performed by using formula (2) below:

$$R_{ss} = \langle E_s E_s^H \rangle = \left\langle \begin{bmatrix} E_{s,x} \\ E_{s,y} \end{bmatrix} \times [E_{s,x}^* \ E_{s,y}^*] \right\rangle = \begin{bmatrix} \langle E_{s,x} E_{s,x}^* \rangle & \langle E_{s,x} E_{s,y}^* \rangle \\ \langle E_{s,y} E_{s,x}^* \rangle & \langle E_{s,y} E_{s,y}^* \rangle \end{bmatrix} \quad (2)$$

In this embodiment, the matrix subtraction unit 12 subtracts the second correlation matrix $R_{ss}$ obtained by the first processing unit 11 by the first correlation matrix $R_{nn}$, to obtain the third matrix M. With the subtraction processing, influences of the noises in the optical transmission link may be eliminated from the second correlation matrix $R_{ss}$. For example, the matrix subtraction unit 12 may be, for example, a subtractor, etc.

In this embodiment, the calculating unit 13 may perform singular value decomposition on the third matrix M, and calculate a polarization dependent loss according to a result of the singular value decomposition. For example, the singular value decomposition may be expressed by formula (3) below:

$$USV^H = M = R_{ss} - R_{nn} \quad (3);$$

where, U and V are unitary matrices, S is a diagonal matrix and may be expressed as $$S = \begin{bmatrix} S_{11} & 0 \\ 0 & S_{22} \end{bmatrix};$$

where, $S_{11}$ denotes a parameter related to power in the X polarization state, and $S_{22}$ denotes a parameter related to power in the Y polarization state.

The calculating unit 13 may calculate the polarization dependent loss (PDL) according to elements $S_{11}$ and $S_{22}$ on a diagonal in the diagonal matrix S. for example, the calculation may be performed according to formula (4) below:

$$PDL = 10\log_{10}\left(\frac{S_{11}}{S_{22}}\right). \quad (4)$$

In this embodiment, reference may be made to Document 1 mentioned in the Background of this disclosure for detailed description of performing the singular value decomposition and calculating the PDL by the calculating unit 13.

According to this embodiment, by performing the singular value decomposition on the third matrix with the noises in the optical transmission link being eliminated, influences of the noises in the optical transmission link on the polarization dependent loss may be eliminated, thereby calculating the polarization dependent loss more accurately.

Embodiment 2

Embodiment 2 of this disclosure provides an apparatus for monitoring a polarization dependent loss, which corresponds to Embodiment 1. In this embodiment, contents different from those in Embodiment 1 shall be described, and contents identical to those in Embodiment 1 shall not be described herein any further.

Figure 7:
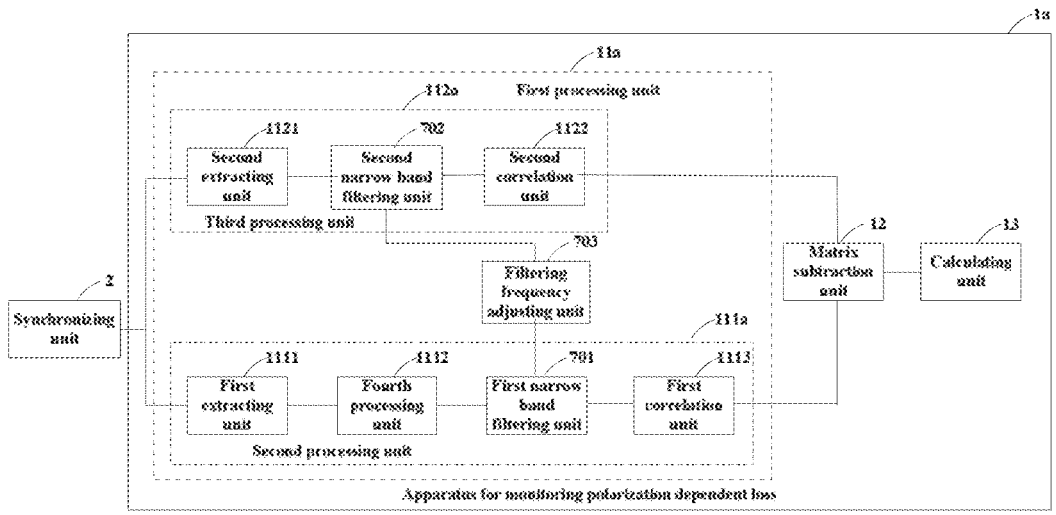
FIG. 7 is a schematic diagram of the apparatus for monitoring a polarization dependent loss of Embodiment 2 of this disclosure.

FIG. 7 is a schematic diagram of the apparatus for monitoring a polarization dependent loss of Embodiment 2 of this disclosure. As shown in FIG. 7, a difference between the apparatus 1a and the apparatus 1 in Embodiment 1 exists in that the apparatus 1a includes a first processing unit 11a, the first processing unit 11a including a second processing unit 111a and a third processing unit 112a; in comparison with the second processing unit 111 in FIG. 1, the second processing unit 111a further includes a first narrow band filtering unit 701, and in comparison with the third processing unit 112 in FIG. 1, the third processing unit 112a further includes a second narrow band filtering unit 702.

In this embodiment, the first narrow band filtering unit 701 may perform first narrow band filtering on the noise signals $E_n$, to generate signals $E_{nf}$; where, $$E_{nf} = \begin{bmatrix} E_{nf,x} \\ E_{nf,y} \end{bmatrix}.$$

The first correlation unit 1113 may perform correlation processing on the signals $E_{nf}$, to generate the first correlation matrix $R_{nn}$. For example, the correlation processing may be performed according to formula (1a) below:

$$R_{nn} = \langle E_{nf} E_{nf}^H \rangle = \left\langle \begin{bmatrix} E_{nf,x} \\ E_{nf,y} \end{bmatrix} \times [E_{nf,x}^* \; E_{nf,y}^*] \right\rangle = \begin{bmatrix} \langle E_{nf,x} E_{nf,x}^* \rangle & \langle E_{nf,x} E_{nf,y}^* \rangle \\ \langle E_{nf,y} E_{nf,x}^* \rangle & \langle E_{nf,y} E_{nf,y}^* \rangle \end{bmatrix} \quad (1a)$$

The second narrow band filtering unit 702 may perform second narrow band filtering on the second signals $E_s$ to generate signals $E_{sf}$; where, $$E_{sf} = \begin{bmatrix} E_{sf,x} \\ E_{sf,y} \end{bmatrix}.$$

The second correlation unit 1122 may perform correlation processing on the signals $E_{sf}$, to generate the second correlation matrix $R_{ss}$. For example, the correlation processing may be performed according to formula (2a) below:

$$R_{ss} = \langle E_{sf} E_{sf}^H \rangle = \left\langle \begin{bmatrix} E_{sf,x} \\ E_{sf,y} \end{bmatrix} \times [E_{sf,x}^* \; E_{sf,y}^*] \right\rangle = \begin{bmatrix} \langle E_{sf,x} E_{sf,x}^* \rangle & \langle E_{sf,x} E_{sf,y}^* \rangle \\ \langle E_{sf,y} E_{sf,x}^* \rangle & \langle E_{sf,y} E_{sf,y}^* \rangle \end{bmatrix} \quad (2a)$$

In this embodiment, filtering frequencies of the first narrow band filtering unit 701 and the second narrow band filtering unit 702 may be identical. And the filtering frequencies of the first narrow band filtering unit 701 and the second narrow band filtering unit 702 may be, for example, 2 Ghz, and the bandwidth of 2 Ghz may be deemed as a narrow band relative to a bandwidth of a signal, such as 74 Ghz. However, this embodiment is not limited thereto, and the filtering bandwidth may also be other values.

During transmission of optical signals, a polarization mode dispersion (PMD) effect will occur, that is, during transmission of optical signals, speeds of transmission of signals in two polarization states are different. The PMD effect and the PDL co-act, which results in the PDL to be related to a wavelength, that is, values of the PDL are different at different frequencies. In this embodiment, by providing the first narrow band filtering unit 701 and the second narrow band filtering unit 702, noise signals and second signals of identical frequencies may be selected, thereby calculating a PDL corresponding to a frequency band, and improving accuracy of calculating a PDL.

In this embodiment, as shown in FIG. 7, the apparatus 1a for monitoring a polarization dependent loss may further include a filtering adjusting unit 703. The filtering adjusting unit 703 may adjust the filtering frequencies of the first narrow band filtering unit 701 and the second narrow band filtering unit 702, hence, the apparatus 1a for monitoring a polarization dependent loss is able to calculate PDLs to which different frequency bands correspond. For example, the filtering adjusting unit 703 may make the filtering frequencies of the first narrow band filtering unit 701 and the second narrow band filtering unit 702 changed within a whole frequency range of the received optical signals. Hence, the apparatus 1a for monitoring a polarization dependent loss is able to calculate PDLs to which different frequency bands correspond within the whole frequency range of the received optical signals.

Embodiment 3

Embodiment 3 of this disclosure provides a method for monitoring a polarization dependent loss, which corresponds to the apparatus in Embodiment 1.

Figure 8:
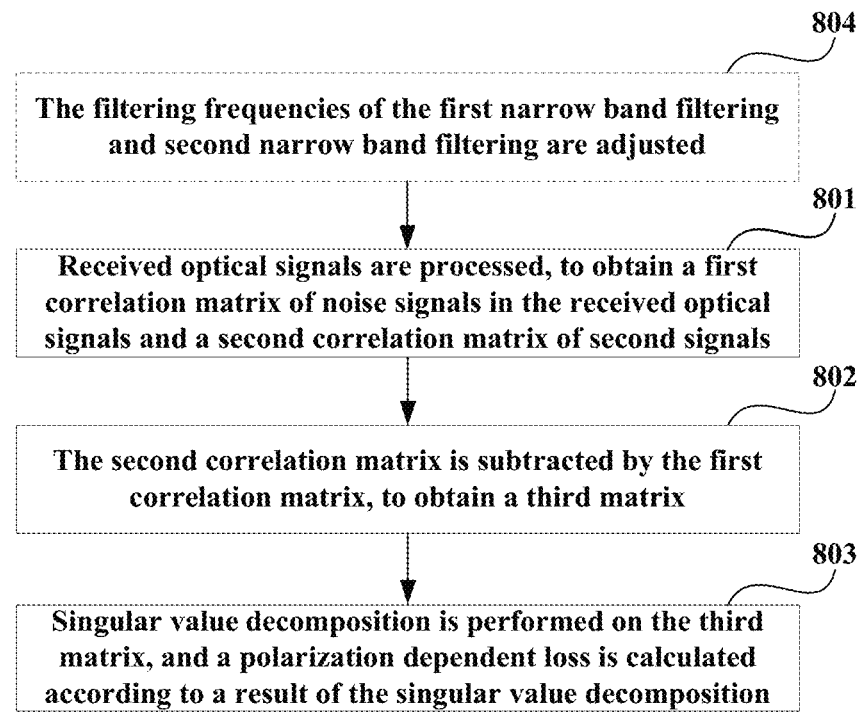
FIG. 8 is a flowchart of the method for monitoring a polarization dependent loss of Embodiment 3 of this disclosure.

FIG. 8 is a flowchart of the method for monitoring a polarization dependent loss of Embodiment 3 of this disclosure. As shown in FIG. 8, the method includes:

step 801: received optical signals are processed, to obtain a first correlation matrix $R_{nn}$ of noise signals in the received optical signals and a second correlation matrix $R_{ss}$ of second signals in the received optical signals other than first signals having predetermined spectral features;

step 802: the second correlation matrix $R_{ss}$ is subtracted by the first correlation matrix $R_{nn}$, to obtain a third matrix; and step 803: singular value decomposition is performed on the third matrix, and a polarization dependent loss (PDL) is calculated according to a result of the singular value decomposition.

Figure 9:
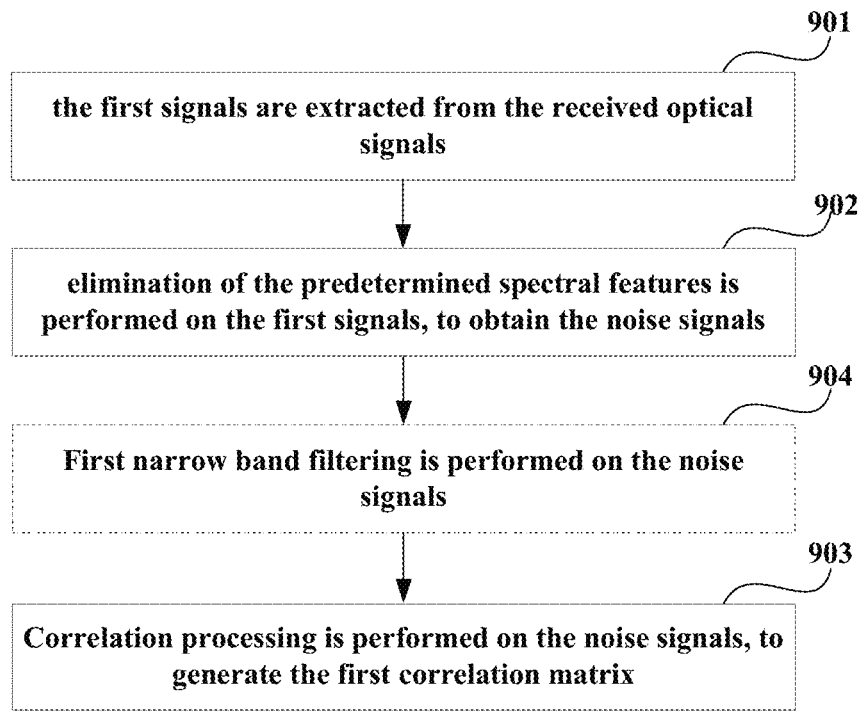
FIG. 9 is a flowchart of a method for calculating a first correlation matrix of Embodiment 3 of this disclosure.

FIG. 9 is a flowchart of a method for calculating the first correlation matrix of Embodiment 3 of this disclosure. As shown in FIG. 9, the method includes:

step 901: the first signals are extracted from the received optical signals;

step 902: elimination of the predetermined spectral features is performed on the first signals, to obtain the noise signals; and step 903: correlation processing is performed on the noise signals, to generate the first correlation matrix.

As shown in FIG. 9, the method may further include:

step 904: first narrow band filtering is performed on the noise signals.

In step 903, correlation processing may be performed on the noise signals after being processed with respect to first narrow band filtering, to generate the first correlation matrix $R_{nn}$.

Figure 10:
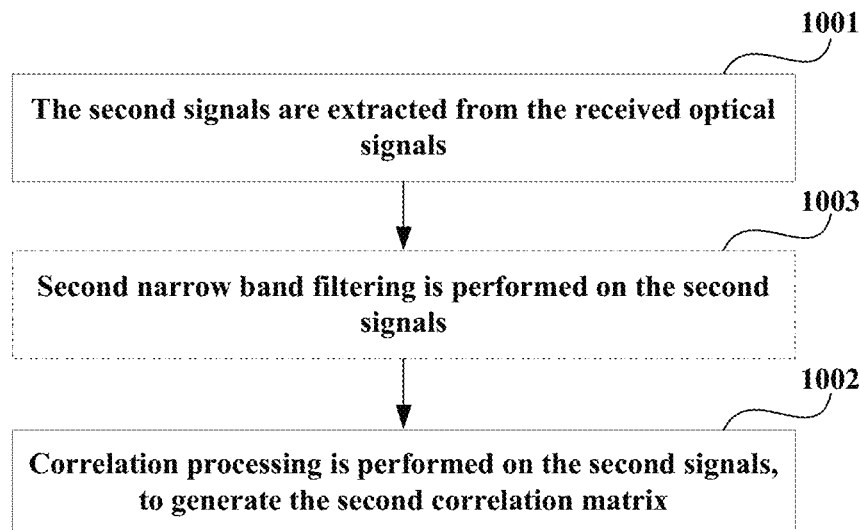
FIG. 10 is a flowchart of a method for calculating a first correlation matrix of Embodiment 3 of this disclosure.

FIG. 10 is a flowchart of a method for obtaining the second correlation matrix of Embodiment 3 of this disclosure. As shown in FIG. 10, the method includes:

step 1001: the second signals are extracted from the received optical signals; and step 1002: correlation processing is performed on the second signals, to generate the second correlation matrix.

As shown in FIG. 10, the method may further include:

step 1003: second narrow band filtering is performed on the second signals.

In step 1002, correlation processing may be performed on the second signals after being processed with respect to second narrow band filtering, to generate the second correlation matrix $R_{ss}$.

In this embodiment, filtering frequencies of the first narrow band filtering and second narrow band filtering may be identical.

In this embodiment, as shown in FIG. 8, the method may further include:

step 804: the filtering frequencies of the first narrow band filtering and second narrow band filtering are adjusted.

In this embodiment, reference may be made to the explanations of the units of the apparatus for monitoring a polarization dependent loss for detailed description of the above steps, which shall not be described herein any further.

According to this embodiment, by performing the singular value decomposition on the third matrix with the noises in the optical transmission link being eliminated, influences of the noises in the optical transmission link on the polarization dependent loss may be eliminated, thereby calculating the polarization dependent loss more accurately. Furthermore, the method of this embodiment may further be able to eliminate an influence of a polarization mode dispersion (PMD) effect, and improve accuracy of calculating a polarization dependent loss.

Embodiment 4

Embodiment 4 of this disclosure provides a receiver, including the apparatus for monitoring a polarization dependent loss described in Embodiment 1 or 2, a structure of which being as described in Embodiment 1 and 2, which shall not be described herein any further.

It can be seen from the above embodiment that after receiving signals transmitted by a transmitter, the receiver may calculate a polarization dependent loss of an optical transmission link more accurately, thereby solving a problem in the related art.

Embodiment 5

Figure 11:
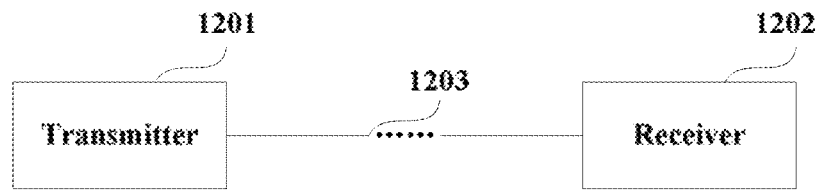
FIG. 11 is a schematic diagram of a structure of the communication system of Embodiment 5 of this disclosure.

FIG. 11 is a schematic diagram of a structure of the coherent optical communication system of Embodiment 5 of this disclosure. As shown in FIG. 11, the coherent optical communication system 1200 includes a transmitter 1201, a receiver 1202 and a link 1203 between the transmitter 1201 and the receiver 1202; a structure of the receiver 1202 is as shown in FIG. 4, the contents of which being incorporated herein, and being not going to be described herein any further.

In this embodiment, the transmitter 1201 may be the transmitter described in Embodiment 1, the contents of which being incorporated herein, and being not going to be described herein any further.

Figure 12:
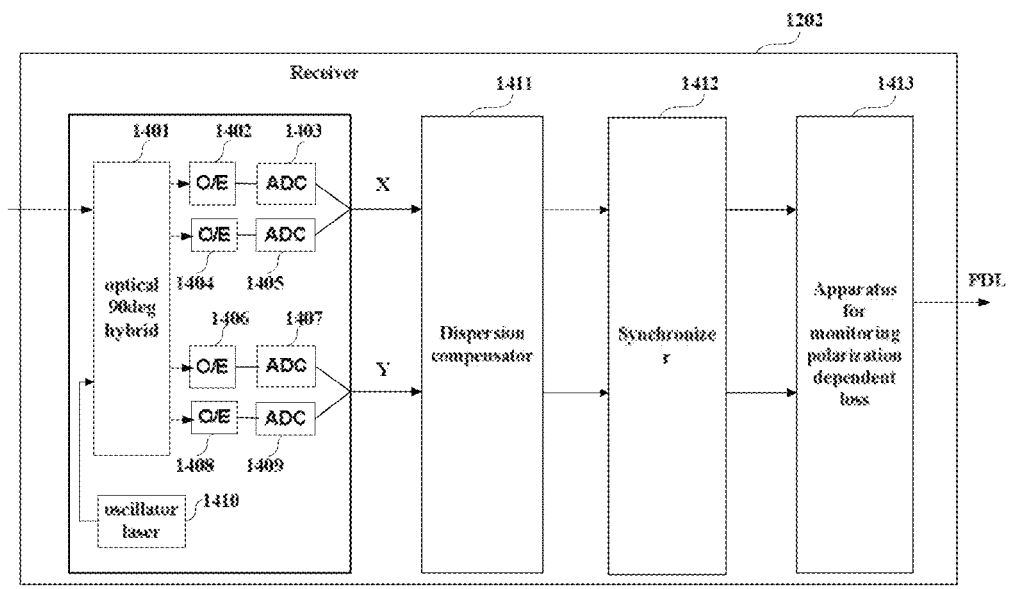
FIG. 12 is a schematic diagram of a structure of the receiver of Embodiment 5 of this disclosure.

FIG. 12 is a schematic diagram of a structure of the receiver of Embodiment 5 of this disclosure.

As shown in FIG. 12, after signals transmitted by the transmitter 1201 are transmitted via the link 1203, signals received by the receiver 1202 may contain a plurality of linear and nonlinear damages. Hence, before an apparatus 1403 for monitoring a polarization dependent loss extracts first signals and second signals in different polarization states, the received optical signals may be correspondingly processed, such as compensating for residual dispersion of the received signals, compensating for an imbalance effect of the receiver, and compensating for a frequency offset and phase noise between the receiver and the transmitter, etc.

For example, in this embodiment, as shown in FIG. 12, the receiver 1202 includes:

a front end, which converts an inputted optical signal into baseband signals in two polarization states, in the embodiment of this disclosure, the two polarization states including an X polarization state and a Y polarization state; wherein, the X polarization state and the Y polarization state may correspond to an H polarization state and a V polarization state, respectively.

As shown in FIG. 12, the front end includes an oscillator laser 1410, an optical 90 deg hybrid 1401, opto-electronic (O/E) detectors 1402, 1404, 1406 and 1408, and analog-to-digital converters (ADCs) 1403, 1405, 1407 and 1409. The oscillator laser 1410 is configured to provide a local light source; an optical signal is converted into a baseband signal in one polarization state after passing through the optical 90 deg hybrid 1401, the opto-electronic (O/E) detectors 1402 and 1404 and the analog-to-digital converters (ADCs) 1403 and 1405; and the optical signal is converted into a baseband signal in the other polarization state after passing through the optical 90 deg hybrid 1401, the opto-electronic (O/E) 1406 and 1408 and the analog-to-digital converters (ADCs) 1407 and 1409, with a detailed process being similar to that in the related art, and being not going to be described herein any further.

Furthermore, the receiver 1202 includes a dispersion compensator 1411 and/or a synchronizer 1412; wherein, a function of the synchronizer 1412 is as that of the synchronizing unit 2 described in Embodiment 1, the contents of which being incorporated herein, and being not going to be described herein any further.

It can be seen from the above embodiment that in the coherent optical communication system, by performing the singular value decomposition on the third matrix with the noises in the optical transmission link being eliminated, influences of the noises in the optical transmission link on the polarization dependent loss may be eliminated, thereby calculating the polarization dependent loss more accurately. And furthermore, the method of this embodiment may further be able to eliminate an influence of a polarization mode dispersion (PMD) effect, and improve accuracy of calculating a polarization dependent loss.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium, such as a non-transitory computer readable storage for storing the above program, such as a hard disk, a floppy disk, a CD, a DVD, and a flash memory, etc.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing embodiments 1-5, following supplements are further disclosed.

Supplement 1. An apparatus for monitoring a polarization dependent loss (PDL), including:

a first processing unit configured to process received optical signals, to obtain a first correlation matrix $R_{nn}$ of noise signals in the received optical signals and a second correlation matrix $R_{ss}$ of second signals in the received optical signals other than first signals having predetermined spectral features;

a matrix subtraction unit configured to subtract the second correlation matrix $R_{ss}$ by the first correlation matrix $R_{nn}$, to obtain a third matrix M; and a calculating unit configured to perform singular value decomposition on the third matrix M, and calculate a polarization dependent loss according to a result of the singular value decomposition.

Supplement 2. The apparatus according to supplement 1, wherein the first processing unit includes:

a second processing unit configured to process the received optical signals, to obtain the first correlation matrix; and a third processing unit configured to process the received optical signals, to obtain the second correlation matrix.

Supplement 3. The apparatus according to supplement 2, wherein the second processing unit includes:

a first extracting unit configured to extract the first signals from the received optical signals;

a fourth processing unit configured to perform elimination of the predetermined spectral features on the first signals, to obtain the noise signals; and a first correlation unit configured to perform correlation processing on the noise signals, to generate the first correlation matrix.

Supplement 4. The apparatus according to supplement 3, wherein the third processing unit includes:

a second extracting unit configured to extract the second signals from the received optical signals; and a second correlation unit configured to perform correlation processing on the second signals, to generate the second correlation matrix.

Supplement 5. The apparatus according to supplement 4, wherein, the second processing unit further includes:

a first narrow band filtering unit configured to perform first narrow band filtering on the noise signals;

and the first correlation unit performs correlation processing on the noise signals after being processed by the first narrow band filtering unit, to generate the first correlation matrix $R_{nn}$;

and the third processing unit further includes:

a second narrow band filtering unit configured to perform second narrow band filtering on the second signals;

and the second correlation unit performs correlation processing on the second signals after being processed by the second narrow band filtering unit, to generate the second correlation matrix $R_{ss}$;

and wherein, filtering frequencies of the first narrow band filtering unit and the second narrow band filtering unit are identical.

Supplement 6. The apparatus according to supplement 5, wherein the first processing unit further includes:

a filtering adjusting unit configured to adjust the filtering frequencies of the first narrow band filtering unit and the second narrow band filtering unit.

Supplement 7. A receiver, including the apparatus for monitoring a polarization dependent loss as described in any one of supplements 1-6.

Supplement 8. A communication system, including a transmitter and a receiver; wherein, the transmitter is configured to transmit optical signals containing payloads and signals with known frequencies to the receiver, frequencies of the signals with known frequencies being different in two polarization states of the optical signals;

and the receiver is the receiver as described in supplement 7.

Supplement 9. A method for monitoring a polarization dependent loss (PDL), including:

processing received optical signals, to obtain a first correlation matrix $R_{nn}$ of noise signals in the received optical signals and a second correlation matrix $R_{ss}$ of second signals in the received optical signals other than first signals having predetermined spectral features;

subtracting the second correlation matrix $R_{ss}$ by the first correlation matrix $R_{nn}$, to obtain a third matrix M; and performing singular value decomposition on the third matrix M, and calculating a polarization dependent loss (PDL) according to a result of the singular value decomposition.

Supplement 10. The method according to supplement 9, wherein the step of obtaining the first correlation matrix includes:

extracting the first signals from the received optical signals;

performing elimination of the predetermined spectral features on the first signals, to obtain the noise signals; and performing correlation processing on the noise signals, to generate the first correlation matrix.

Supplement 11. The method according to supplement 10, wherein the step of obtaining the second correlation matrix includes:

extracting the second signals from the received optical signals; and performing correlation processing on the second signals, to generate the second correlation matrix.

Supplement 12. The method according to supplement 11, wherein, the step of obtaining the first correlation matrix further includes:

performing first narrow band filtering on the noise signals;

wherein, correlation processing is performed on the noise signals after being processed with respect to first narrow band filtering, to generate the first correlation matrix $R_{nn}$;

and the step of obtaining the second correlation matrix further includes:

performing second narrow band filtering on the second signals;

wherein, correlation processing is performed on the second signals after being processed with respect to second narrow band filtering, to generate the second correlation matrix $R_{ss}$;

wherein, filtering frequencies of the first narrow band filtering and second narrow hand filtering are identical.

Supplement 13. The method according to supplement 12, wherein method further includes:

adjusting the filtering frequencies of the first narrow band filtering and second narrow band filtering.

What is claimed is:

1. An apparatus for monitoring a polarization dependent loss (PDL), comprising:
   a first processor configured to process received optical signals, to obtain a first correlation matrix $R_{nn}$ of noise signals in the received optical signals and a second correlation matrix $R_{SS}$ of second signals other than first signals in the received optical signals, the first signals having predetermined spectral features that is identical to spectral features of pilot signals in optical signals transmitted by a transmitter;
   a matrix subtractor configured to subtract the second correlation matrix $R_{SS}$ by the first correlation matrix $R_{nn}$, to obtain a third matrix M; and
   a calculator configured to perform singular value decomposition on the third matrix M, and calculate a polarization dependent loss according to a result of the singular value decomposition;

wherein the first processor comprises:
a second processor configured to process the received optical signals, to obtain the first correlation matrix $R_{nn}$;
a third processor configured to process the received optical signals, to obtain the second correlation matrix $R_{ss}$;
wherein the second processor comprises:
a first extractor configured to extract the first signals from the received optical signals;
a fourth processor configured to perform elimination of the predetermined spectral features on the first signals, to obtain the noise signals; and
a first correlator configured to perform correlation processing on the noise signals, to generate the first correlation matrix.

2. The apparatus according to claim 1, wherein the third processor comprises:
a second extractor configured to extract the second signals from the received optical signals; and
a second correlator configured to perform correlation processing on the second signals, to generate the second correlation matrix.

3. The apparatus according to claim 2, wherein,
the second processor further comprises:
a first narrow band filter configured to perform first narrow band filtering on the noise signals; and
the first correlator performs correlation processing on the noise signals after being processed by the first narrow band filter, to generate the first correlation matrix $R_{nn}$; and
the third processor further comprises:
a second narrow band filter configured to perform second narrow band filtering on the second signals; and
the second correlator performs correlation processing on the second signals after being processed by the second narrow band filter, to generate the second correlation matrix $R_{ss}$; and
wherein, filtering frequencies of the first narrow band filter and the second narrow band filter are identical.

4. The apparatus according to claim 3, wherein the first processor further comprises:
a filtering adjuster configured to adjust the filtering frequencies of the first narrow band filter and the second narrow band filter.

5. A receiver, comprising the apparatus for monitoring a polarization dependent loss as recited in claim 1.

6. A communication system, comprising a transmitter and a receiver; wherein,
the transmitter is configured to transmit optical signals containing payloads and signals with known frequencies to the receiver, frequencies of the signals with known frequencies being different in two polarization states of the optical signals; and
the receiver is the receiver as described in claim 5.

7. A method for monitoring a polarization dependent loss (PDL), comprising:
processing received optical signals, to obtain a first correlation matrix $R_{nn}$ of noise signals in the received optical signals and a second correlation matrix $R_{SS}$ of second signals other than first signals in received optical signals, the first signals having predetermined spectral features that is identical to spectral features of pilot signals in optical signals transmitted by a transmitter;
subtracting the second correlation matrix $R_{SS}$ by the first correlation matrix $R_{nn}$, to obtain a third matrix M; and
performing singular value decomposition on the third matrix M, and calculating a polarization dependent loss (PDL) according to a result of the singular value decomposition,
wherein obtaining the first correlation matrix $R_{nn}$ comprises:
extracting the first signals from the received optical signals;
performing elimination of the predetermined spectral features on the first signals, to obtain the noise signals; and
performing correlation processing on the noise signals, to generate the first correlation matrix.

8. The method according to claim 7, wherein obtaining the second correlation matrix comprises:
extracting the second signals from the received optical signals; and
performing correlation processing on the second signals, to generate the second correlation matrix.

9. The method according to claim 8, wherein,
obtaining the first correlation matrix further comprises:
performing first narrow band filtering on the noise signals;
wherein, correlation processing is performed on the noise signals after being processed with respect to first narrow band filtering, to generate the first correlation matrix $R_{nn}$; and
obtaining the second correlation matrix further comprises:
performing second narrow band filtering on the second signals;
wherein, correlation processing is performed on the second signals after being processed with respect to second narrow band filtering, to generate the second correlation matrix $R_{ss}$;
wherein, filtering frequencies of the first narrow band filtering and second narrow band filtering are identical.

10. The method according to claim 9, wherein method further comprises:
adjusting the filtering frequencies of the first narrow band filtering and second narrow band filtering.

11. A non-transitory computer readable storage storing a method according to claim 7.

* * * * *